No. 617,414. Patented Jan. 10, 1899.
H. J. DOUGHTY.
VULCANIZING APPARATUS.
(Application filed Feb. 14, 1898.)
(No Model.) 3 Sheets—Sheet 1.
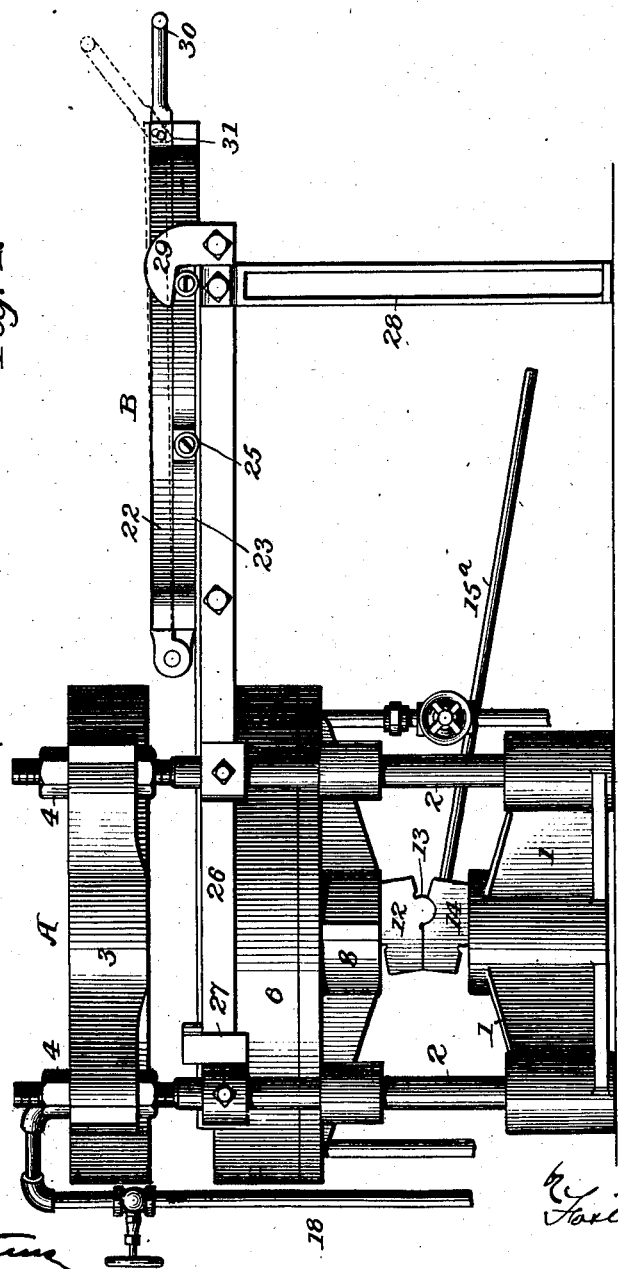

No. 617,414. Patented Jan. 10, 1899.
H. J. DOUGHTY.
VULCANIZING APPARATUS.
(Application filed Feb. 14, 1898.)
(No Model.) 3 Sheets—Sheet 2.
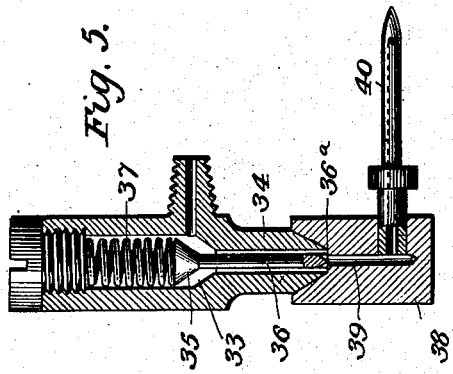
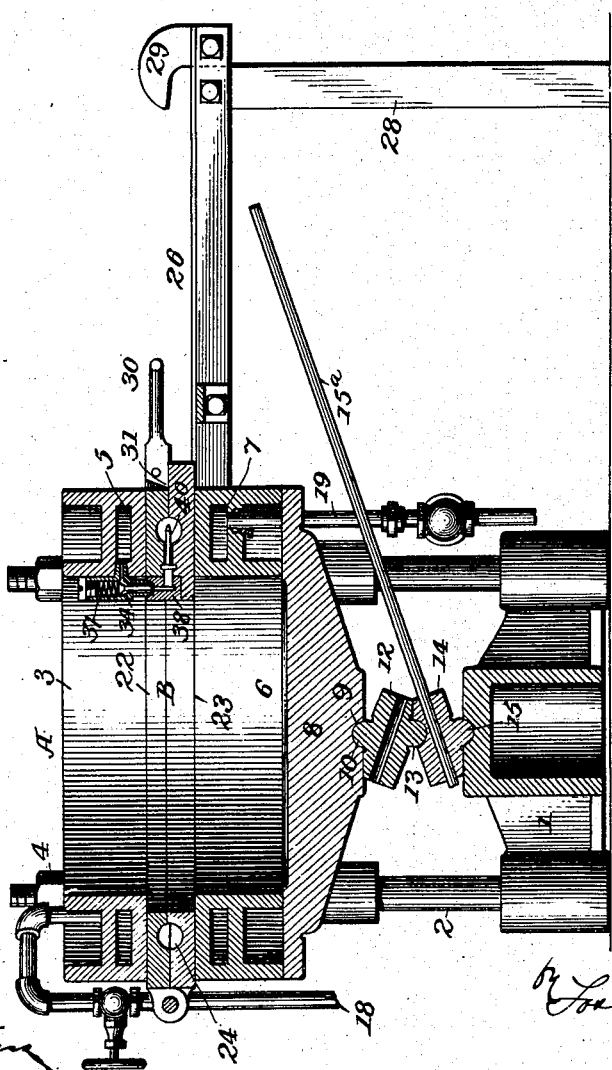

No. 617,414. Patented Jan. 10, 1899.
H. J. DOUGHTY.
VULCANIZING APPARATUS.
(Application filed Feb. 14, 1898.)
(No Model.) 3 Sheets—Sheet 3.
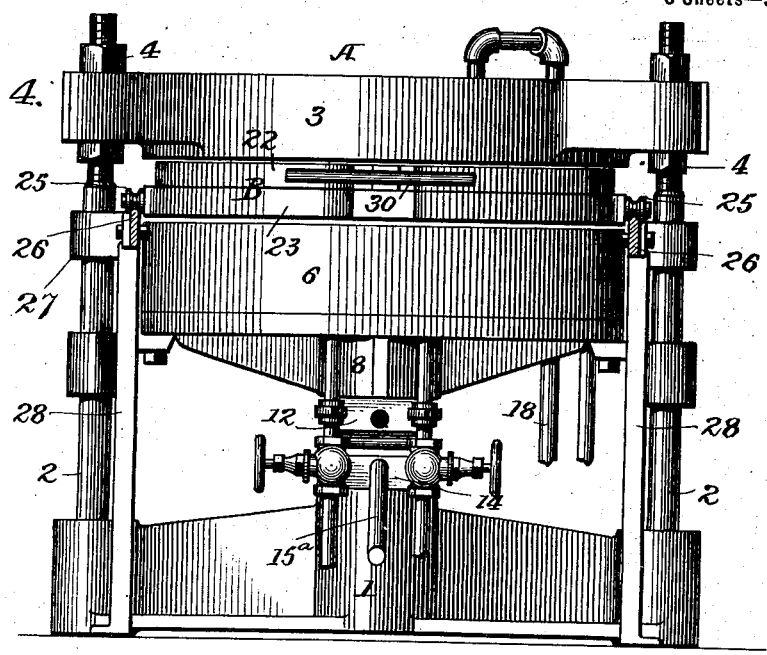
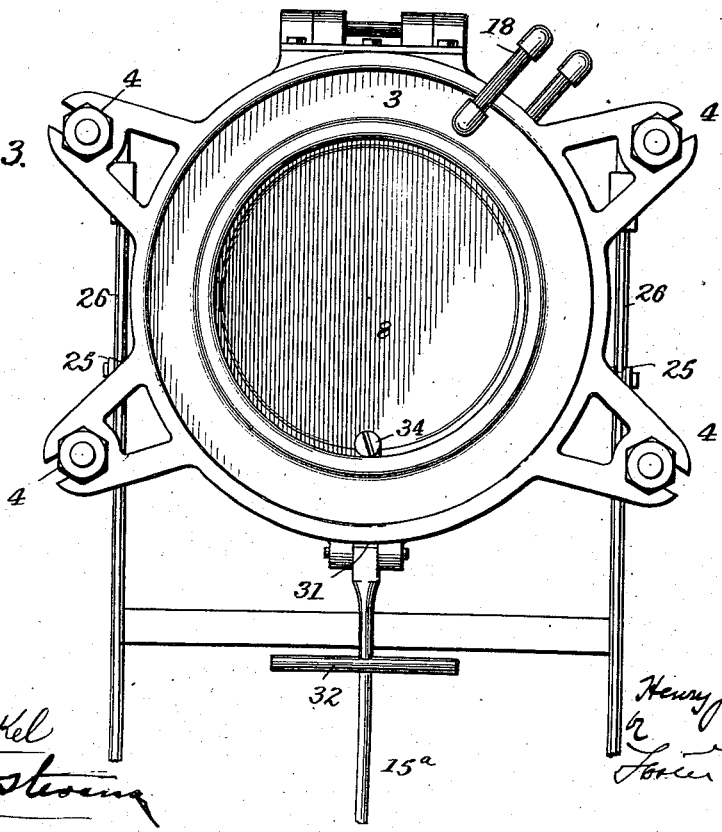

UNITED STATES PATENT OFFICE.

HENRY JAMES DOUGHTY, OF PROVIDENCE, RHODE ISLAND.

VULCANIZING APPARATUS.

SPECIFICATION forming part of Letters Patent No. 617,414, dated January 10, 1899.

Application filed February 14, 1898. Serial No. 670,248. (No model.)

*To all whom it may concern:*

Be it known that I, HENRY JAMES DOUGHTY, a citizen of the United States, residing at Providence, in the county of Providence and State of Rhode Island, have invented certain new and useful Improvements in Vulcanizing Apparatus, of which the following is a specification.

This invention relates to certain new and useful improvements in apparatus for molding and vulcanizing hollow articles, and more especially pneumatic tubes, having for its object to provide means whereby such articles may be expeditiously, economically, and effectually formed; and with this object in view the invention consists in the novel construction, arrangement, and combination of parts hereinafter more particularly described.

In the accompanying drawings, forming a part of this specification, and in which like letters and numerals of reference indicate corresponding parts, Figure 1 is a side elevation of an apparatus embodying the invention, the platens of the vulcanizer being separated and the mold withdrawn from between the same. Fig. 2 is a vertical sectional view of the apparatus with the parts in position for molding and vulcanizing. Fig. 3 is a plan view of the apparatus, parts being broken away. Fig. 4 is a front elevation of the apparatus, and Fig. 5 is a detail sectional view of the inflating-needle and the control-valve therefor.

Briefly stated, the apparatus consists of a vulcanizer comprising two platens with suitable means for heating the same and for moving them to and from each other, and coöperating with the vulcanizer is a suitable separable mold, which is adapted to be inserted between the platens of the vulcanizer to vulcanize its contained articles and to be withdrawn from between the platens in order that it may be opened to permit the finished articles to be readily removed and replaced by unfinished articles.

The invention, as hereinbefore stated, is more particularly adapted for molding and vulcanizing hollow articles—such as water-bags, air-cushions, pneumatic tubes, &c.—which it is necessary to expand within and cause to conform closely to the interior surface of the mold. It may, however, be employed for molding other articles with but slight modification. In the present instance the apparatus is intended for use in the manufacture of pneumatic tires for bicycles and other vehicles, and embodies means for automatically inflating such tires within the mold with air, steam, water, or other fluid under pressure when the mold is inserted in the vulcanizer and the platens thereof have been brought into engagement with the mold.

Referring more particularly to the drawings, A designates the vulcanizer, comprising a base 1, from which extend vertical standards 2, provided with screw-threaded upper ends. Supported and vertically adjustable upon the threaded ends of these standards is a platen 3, the upper and lower faces of which are engaged by nuts 4, which serve to support the platen and hold it in any position to which it is adjusted. This platen in the present instance is annular, as shown, and is provided with a correspondingly-shaped chamber 5 and a lower flat face.

Suitably guided upon the standards 2 below the platen 3 is a second platen 6, the upper face of which is flat and, like the first, is annular and provided with a chamber 7. This lower platen 6 is adapted to move freely to and from the upper platen 3, and while different means for lifting and lowering the platen may be employed it is preferred to make use of hand-operated devices for performing this function. Thus, as shown, the lower platen 6 is supported upon a base-plate 8, which is adapted, like the platen, to move freely upon the standards 2, and is provided centrally in its lower face with a semicircular recess 9, and upon opposite sides of the recess with flat bearings. Received into and conforming to the recess 9 is a rib 10 upon the upper face of a toggle-block 12, which block upon opposite sides of the rib is formed with oppositely-inclined flat bearing-surfaces, one of which is adapted to be brought into contact with the bearing upon one side of the recess 9 when the platen 6 is in its lowered position and the other into contact with the bearing upon the opposite side of the recess when the platen is in its elevated position. The lower face of the toggle-block, like the upper, is provided with a rib 13, the surfaces upon opposite sides of which are oppositely inclined, such surfaces, however, being oppositely inclined to the corresponding surfaces upon the upper face of the block. The rib 13 of the block 12 is received into a semicircular recess in the upper face of a second toggle-block 14, which latter block otherwise is identical in construction with the said block 12, being provided at its upper and lower faces with inclined flat bearing-surfaces and upon its under face with a rib 15, which is received into a socket or recess of the base 1. The bearings at the upper face of the lower block 14 are adapted to engage with the oppositely-inclined bearings at the lower face of the upper block 12, and the bearings at the lower face of the block 14 are adapted to alternately engage with flat bearings of the base 1 upon opposite sides of the socket thereof. Extending from one of the toggle-blocks and preferably from the lower one, as shown, is an operating handle or lever 15ª, by means of which the said toggle-block is rocked. When the toggle-blocks 12 14 are in the position indicated in Fig. 2, it will be seen that the bearings at the upper face of the block 12 and that at the lower face of the block 14 at corresponding ends of said blocks upon the left-hand side of the fulcra thereof are in contact with bearings of the base-plate 8 and base 1, respectively, and the bearings at the lower face of the block 12 and the upper face of the block 14 are in contact with each other at corresponding ends upon the right-hand side of the fulcra of the blocks, the ribs 10, 13, and 15 being all in the same vertical plane, or substantially so, and the platen 6 being in its elevated position. When, however, the operating-lever is depressed, the toggle-blocks are rocked upon their fulcra, the different bearing-surfaces thereof are brought into the positions shown in Fig. 1, and the rib 13 is moved out of alinement with the ribs 10 15, in consequence of which the platen 6 is brought to its lowered position.

In order to supply the chambers 5 7 of the upper and lower platens with a suitable heating fluid, supply-pipes 18 19 are provided, which communicate with the said chambers 5 7, respectively, and as there is but a very slight movement of the parts the pipe may be directly connected, as the spring of the pipe will be sufficient without any sliding joints.

Coöperating with the vulcanizer is a suitable mold B, formed in two or more separable sections, which permit ready access to the interior of the mold. As shown, the mold comprises two annular sections 22 23, which are hinged together at one side and provided in their opposing faces with semicircular annular channels, which when the mold-sections are brought together register and form an annular circular mold-chamber 24. The upper and lower outer faces of the mold are formed flat, and when the mold is closed it is adapted to be inserted between the platens of the vulcanizer. To the end that the mold may be conveniently and quickly moved between and without the platens with a very little effort upon the part of the operator it is provided upon each side with separated rollers 25, which when the platen 6 is in its lowered position are adapted to rest upon a track 26, the rails of which are parallel and constitute guides, and said rails are arranged upon opposite sides of the vulcanizer. These rails are supported at their inner ends upon brackets 27 of the standards 2, and their outer ends project beyond the press sufficiently far to permit the mold to be moved upon the track to a position wholly without the press, and said ends are supported upon uprights 28 and are provided with stops 29, which arrest the outward movement of the mold.

In its front edge the upper mold-section 22 is provided with a recess within which is pivoted a handle 30, by means of which the mold may be readily moved over the track, and as it sometimes happens in the process of vulcanizing that the mold-sections become stuck together the handle is provided at its inner end with a toe 31, which when the handle is swung upward upon its pivot engages with a bearing of the lower mold-section and forces the two sections apart.

Various devices may be employed for inflating the article within the mold, but those which will now be described are preferred on account of their simplicity and effectiveness.

Leading from the chamber 5 of the platen 3 is a passage 33, which extends through a casing 34, secured to the platen, the said casing projecting slightly below the under face of the platen and being provided with a conical end through which the passage 33 extends. Within the passage 33 is formed a valve-seat to which is adapted a valve 35, provided with a vertical stem 36, which extends through the passage 33 and projects slightly below the end of the casing 34 and is formed at its end with channels 36ª. Above this valve 35 is a spring 37, which serves to force the valve to its seat. One of the mold-sections, preferably the lower one, as shown, is provided with a detachable block or extension 38, the upper end of which when in position is flush with the top surface of the upper mold-section 22 when in its closed position. This extension is provided with a passage 39, which extends through the upper end thereof and terminates in a flaring mouth. Secured to the block or extension is an inflating-needle 40, which is received in a recess in the mold-section 22 and the point of which projects into the channel of said section and is provided with an eye which communicates with a passage extending longitudinally through the needle, and this passage in turn communicates with the passage 39 of the extension 38. Assuming now a tire of vulcanizable material to have been placed in the mold, the end of the inflating-needle having been previously placed within the same and the block 38 placed in position upon the mold-section, the mold is closed and moved along the track to a fixed position (governed by adjustable stops) between the upper and lower platens of the vulcanizer. The lower platen of the vulcanizer is then elevated in the manner hereinbefore described, and in the course of its upward movement it engages with the under face of the mold, lifts it from the track, and carries it into contact with the upper platen, in which position it remains until the tire has been sufficiently vulcanized. During the upward movement of the mold, however, the end of the casing 34 enters the flaring mouth of the extension 38, making a steam-tight connection therewith, and simultaneously the end of the valve-stem 36 makes contact with a bearing in the mouth of the extension, and as the upward movement of the platen continues the valve 35 is lifted from its seat, permitting steam to flow from the chamber 5 through the passages 33 39 and the inflating-needle 40 into the tire, thereby inflating the same and causing it to conform closely to the walls of the mold-chamber, in which inflated condition it is vulcanized.

It will be obvious that although the improved apparatus shown is particularly adapted for molding and vulcanizing annular tubes or vehicle-tires, simply by changing the form of platens and mold other articles—such as straight tubes, water-bags, &c.—may be formed. It will be apparent also that while the passage 33 is shown as communicating with the heating-chamber 5 it may communicate with any other source of fluid-supply. These and various other obvious changes in construction and arrangement may be made without departing from the spirit and scope of the invention, since

What I claim is—

1. The combination with a vulcanizer, of a mold adapted thereto, and means for automatically inflating an article within the mold at a predetermined time, substantially as described.

2. The combination with a vulcanizer comprising two platens, one movable toward and from the other, means for moving the said platen and for heating the same, guides, and a mold movable upon the guides to positions between and without the platens, substantially as described.

3. The combination with a vulcanizer, comprising an upper and a lower platen, each provided with a chamber for containing a heated fluid under pressure, a mold adapted to be inserted between the platens, a hollow inflating-needle extending into the mold-chamber and automatic means for effecting a communication between the passage of the needle and the chamber of one of the platens at a predetermined time, substantially as described.

4. The combination with a vulcanizer comprising an upper and lower platen each being formed with a chamber for containing heated fluid under pressure, a casing having a passage communicating with one of the platen-chambers and a valve for controlling said passage, a mold adapted to be inserted between the platens, a hollow inflating-needle extending into the mold-chamber and means for placing the passage of the needle into communication with that of the casing and for opening the valve in said latter passage at a predetermined time, substantially as described.

5. The combination with a vulcanizer comprising an upper and a lower platen, one of which is movable toward the other, means for moving said platens, a mold adapted to be received between the platens, a hollow inflating-needle extending into the mold-chamber and means for automatically placing the passage of the needle into communication with a source of supply of fluid under pressure, substantially as described.

6. The combination with a vulcanizer comprising an upper and a lower platen and a mold adapted to be received between and to be removed from the platens, said mold comprising two sections hinged together at one side and provided at its opposite side with means for forcing the sections apart, substantially as described.

7. The combination with a vulcanizer comprising an upper and a lower platen, a track extending to and projecting beyond the press, a separable mold provided with rollers or bearings engaging the track, said mold being adapted to move upon the track to positions between and without the platens, substantially as described.

8. A vulcanizer comprising a base, an upper platen and a lower platen, a support for the lower platen, and means for raising and lowering the lower platen comprising two toggle-blocks engaging each other and the support and base respectively, said blocks being provided with inclined bearings upon opposite sides of their fulcra, substantially as described.

9. The combination with a vulcanizer, comprising an upper and a lower platen, means for heating the platens, a separable mold adapted to be inserted between the platens, a hollow inflating-needle detachable from the mold and adapted to extend into the chamber thereof, and means for automatically placing the inflating-needle into communication with a source of supply of fluid under pressure when the mold is inserted into the vulcanizer, substantially as described.

In testimony whereof I have signed my name to this specification in the presence of two subscribing witnesses.

HENRY JAMES DOUGHTY.

Witnesses:
HENRY M. ROGERS,
ALBERT POOR.